United States Patent [19]
Henry et al.

[11] Patent Number: 6,035,080
[45] Date of Patent: Mar. 7, 2000

[54] RECONFIGURABLE ADD-DROP MULTIPLEXER FOR OPTICAL COMMUNICATIONS SYSTEMS

[76] Inventors: Charles Howard Henry, 52 Dogwood La., Skillman, N.J. 08558; Gadi Lenz, 69 Shady La., Fanwood, N.J. 07023; Yuan P. Li, 410 Fairford La., Duluth, Ga. 30097; Christi Kay Madsen, 436 Joan St., South Plainfield, N.J. 07080; Herman Melvin Presby, 467 Lincoln Ave., Highland Park, N.J. 08904; Ronald Edward Scotti, 10 Blacksmith Rd., White House Station, N.J. 08889

[21] Appl. No.: 08/879,929

[22] Filed: Jun. 20, 1997

[51] Int. Cl.[7] ........................................ H04J 14/02
[52] U.S. Cl. ......................... 385/24; 385/16; 359/127; 359/128; 359/130
[58] Field of Search ..................... 385/15, 16, 24; 359/128, 130, 124, 127

[56] References Cited

U.S. PATENT DOCUMENTS

| | | | |
|---|---|---|---|
| 4,900,119 | 2/1990 | Hill et al. | 385/27 |
| 4,963,177 | 10/1990 | Najafi et al. | 65/400 |
| 5,044,715 | 9/1991 | Kawachi et al. | 385/42 |
| 5,271,074 | 12/1993 | Tocci | 385/16 |
| 5,461,683 | 10/1995 | Harman | 385/21 |
| 5,471,332 | 11/1995 | Shiragaki et al. | 359/117 |
| 5,488,500 | 1/1996 | Glance | 359/127 |
| 5,526,439 | 6/1996 | Bergmann | 385/24 |
| 5,771,112 | 6/1998 | Hamel et al. | 359/128 |

*Primary Examiner*—John D. Lee
*Assistant Examiner*—Michael J. Stahl

[57] ABSTRACT

In accordance with the invention, an optical multiplexer includes at least one reconfigurable add-drop unit that can add-drop one channel out of a large set by switching the light path through one of a set of fixed add-drop filters. Reconfiguration is done by switching from the add-drop filter path to a bypass path, changing to a different add-drop filter and then switching back. The phase delay of the bypass path is adjusted to maintain nearly maximum transmission during switching. The selection among add-drop filters is done by sliding an integrated optic chip with the set of add-drop filters between input and output waveguides. The reconfigurable add-drop multiplexer unit is latchable, passive between reconfigurations, and has low intrinsic insertion loss. Plural units in series can add/drop plural channels.

12 Claims, 6 Drawing Sheets

RECONFIGURABLE ADD-DROP MULTIPLEXER FOR OPTICAL COMMUNICATIONS SYSTEMS

FIELD OF THE INVENTION

This invention relates to multiplexers for optical communications systems and, in particular, to a multiplexer which can be reconfigured by adding or dropping channels while maintaining ongoing transmission.

BACKGROUND OF THE INVENTION

The technology of amplifying optical transmission systems with many channel wavelengths is rapidly progressing. Current systems typically carry 8 channels on an optical fiber, and future systems may have as many as 64 channels. The wavelengths must be very closely spaced so that all channels can be optically amplified together. A typical channel separation is 100 GHz or about 0.8 nm. The current technology has focused on combining these wavelengths (multiplexing) on a single fiber at the input of a chain of optically amplifying repeaters and separating these wavelengths (demultiplexing) at the end of the repeater chain. Future systems will also need provisions for partially altering the traffic at each repeater by adding-dropping one or several channels out of the total number. This is a challenging problem because it is desirable that the add-drop multiplexer be reconfigurable: the addition or dropping of a channel should be made without disrupting the traffic on the other channels.

There are several additional concerns. The reconfigurable add-drop multiplexer (R-ADM) should not act as a narrow band filter for the passed channels, since concatenation of such filters at many repeaters would excessively narrow the channel pass bands. The R-ADM should have low transmission loss and low cost, since these important factors ultimately determine which technology is selected. Ideally, the R-ADM should be able to add-drop more than one channel, and in some instances nearly all the channels.

One approach to a R-ADM using existing multiplexer technology is to separate all channels on different waveguides, to run each waveguide through a 2×2 optical switch for adding or dropping the signal and to recombine the channels in a multiplexer (See W.D. Zhong et al., "Reconfigurable multichannel add-drop multiplexer" . . . , Electronic Let., Vol. 16, No. 16, pp. 1477–78 (1996)). The problem with this approach is that the multiplexer acts as a narrow-band filter for every channel. Successive application of such multiplexers has the drawback of narrowing the channel pass bands.

Another approach uses an optical fiber containing a series of Bragg reflectors with reflection bands residing in "guard bands" between channels (See L. Quetel et al., OFC '96 Technical Digest, xxx, pp. 120–121). To drop a channel, the part of the fiber containing a Bragg reflector is heated or stretched, shifting the Bragg reflection band out of the guard band and causing Bragg reflection of a particular channel. This approach has the advantage that all the channels can be dropped, but if more than one channel is add-dropped, a combiner and a multiplexer are needed to combine the added channels and to separate dropped channels. Optical circulators are needed at the ends of the optical fiber to separate the add and drop ports from the input and output of the passed channels, without incurring excessive insertion loss. But the method reserves about half the spectrum for storing the Bragg reflection bands between channels. Accordingly it is not attractive as the number of channels to be squeezed into the Er amplification band increases. Accordingly, there is a need for an improved reconfigurable add-drop multiplexer.

SUMMARY OF THE INVENTION

In accordance with the invention, an optical multiplexer includes at least one reconfigurable add-drop unit that can add-drop one channel out of a large set by switching the light path through one of a set of fixed add-drop filters. Reconfiguration is done by switching from the add-drop filter path to a bypass path, changing to a different add-drop filter and then switching back. The phase delay of the bypass path is adjusted to maintain nearly maximum transmission during switching. The selection among add-drop filters is done by sliding an integrated optic chip with the set of add-drop filters between input and output waveguides. The reconfigurable add-drop multiplexer unit is latchable, passive between reconfigurations, and has low intrinsic insertion loss. Plural units in series can add/drop plural channels.

BRIEF DESCRIPTION OF THE DRAWINGS

The advantages, nature and various additional features of the invention will appear more fully upon consideration of the illustrative embodiments now to be described in detail. In the drawings.

It is to be understood that these drawings are for purposes of illustrating the concepts of the invention and, except for the graphs, are not to scale.

DETAILED DESCRIPTION

This disclosure is divided into three parts. Part I describes the principal components used in the invention. Part II describes the reconfigurable multiplexer in accordance with the invention, and Part III presents considerations useful in designing such a multiplexer for specific applications.

I. THE PRINCIPAL COMPONENTS

There are three principal components in the preferred embodiment of the invention: fixed add-drop filters, a sliding-chip mechanical switch, and a hitless switching bypass path.

A. Fixed Add-Drop filters

Figure 1:
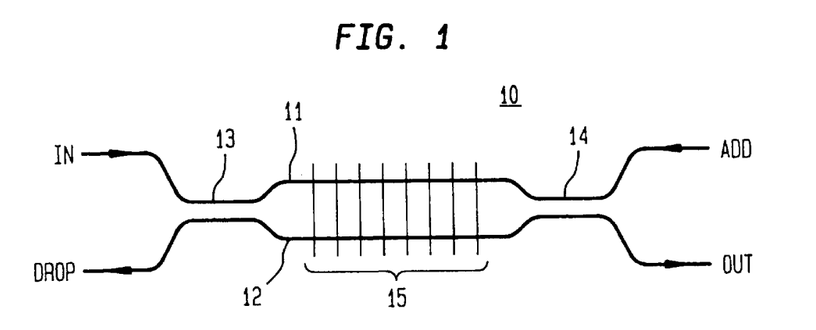
FIG. 1 illustrates a four-port add-drop filter useful in the invention.

Referring to the drawings, FIG. 1 schematically illustrates a low insertion loss add-drop filter (ADF) (10) comprising a pair of Bragg reflecting waveguides 11, 12 coupled together by a pair of spaced apart 3 dB couplers 13, 14. The Bragg reflectors 15 are disposed along the lengths of the waveguides between the 3 dB couplers and are each designed to reflect the same channel of a multichannel optical signal. This is a four port component that ideally can add, drop and pass channels with no intrinsic insertion loss. The signal at the output port is the input signal with the dropped channel replaced by the same wavelength channel inserted at the add port. The dropped channel is presented at the drop port. Further details concerning the structure and operation of an ADF are set forth in G.E. Kohnke et al., "Silica based Mach-Zehnder add-drop filter . . . ", Electronic Lett., Vol. 32, no. 17, pp. 1579–80 (1996) and U.S. Pat. No. 5,636,309 issued to applicant C.H. Henry et al. on Jun. 3, 1997, both of which are incorporated herein by reference. The preferred reconfigurable add-drop multiplexer will use an array of such ADFs.

B. Sliding-Chip Mechanical Switch

Optical switches are needed to direct the optical signals through the path of one of the ADFs. For example, a 16 channel R-ADM will need to be switched between 17 optical paths: one ADF for each channel and a path that passes all channels. This must be done inexpensively and with low insertion loss. An attractive way of doing this is to slide a chip containing the ADF array between separate chips containing input and output guides. The sliding chip switch is latchable: The sliding chip does not move when the drive power is turned off. Further details concerning the structure and operation of a sliding chip switch are set forth in U.S. Pat. No. 5,623,564 entitled "Self-Aligned Mechanical Optical Switch" issued to Herman M. Presby on Apr. 22, 1997, which is incorporated herein by reference. The sliding chip switch in our R-ADM is made of 3 chips.

C. Hitless Switching Bypass Path

The sliding chip switch by itself cannot be used to reconfigure the ADM because it will disrupt the signal traffic as the chip is slid from one ADF to another. Instead, before making this change, it is desirable to switch to a bypass path that is off the sliding chip without losing any bits. The basic problem is that during switching from one path to another, the lightwave separates into two paths, and these contributions interfere when the two paths come together again. For example, this problem occurs in hitless switching to a spare optical fiber transmission line. In one procedure, uncontrolled interference can be avoided by adjusting the polarization of the lightwaves on the two paths to be mutually orthogonal. Another method is to spectrally broaden the lightwave on one of the paths so that destructive interference cannot take place.

Figure 2:
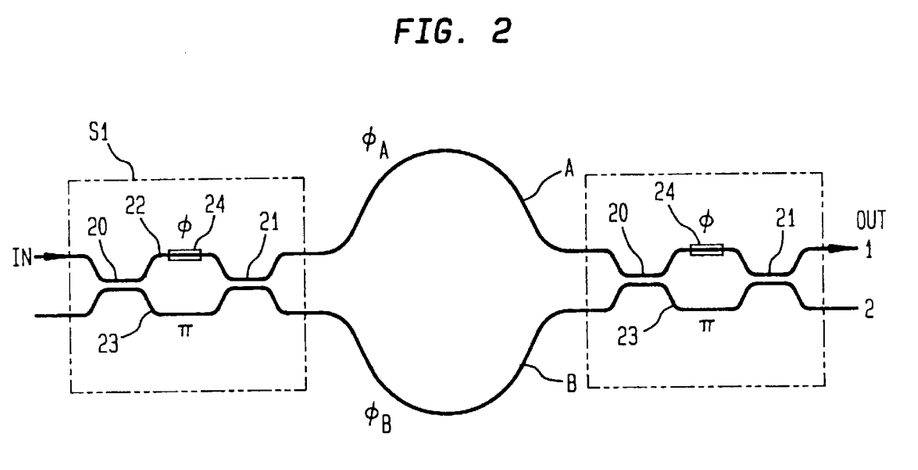
FIG. 2 illustrates a path switch useful in the invention.

FIG. 2 illustrates a preferred bypass switch comprising a pair of waveguide paths A, B connecting a pair of identical thermoptic switches S1, S2. Each thermoptic switch comprises a pair of 3 dB couplers 20, 21 connected by a pair of waveguide arms 22, 23. Arms 22, in path A, are heater arms which include heating element 24 to control the arm optical pathlength (and thus phase). Arms 23 can provide a phase shift of $\pi$ as compared with unheated arms 22.

In operation, the thermo-optic switches S1 and S2 determine which path input light will take. Suppose that in the absence of power ($\phi=0$), the lightwave is in path A. If sufficient power is then applied to make $\phi=\pi$, then the lightwave is redirected to path B.

II. THE PREFERRED RECONFIGURABLE ADD-DROP MULTIPLEXER

Figure 3:
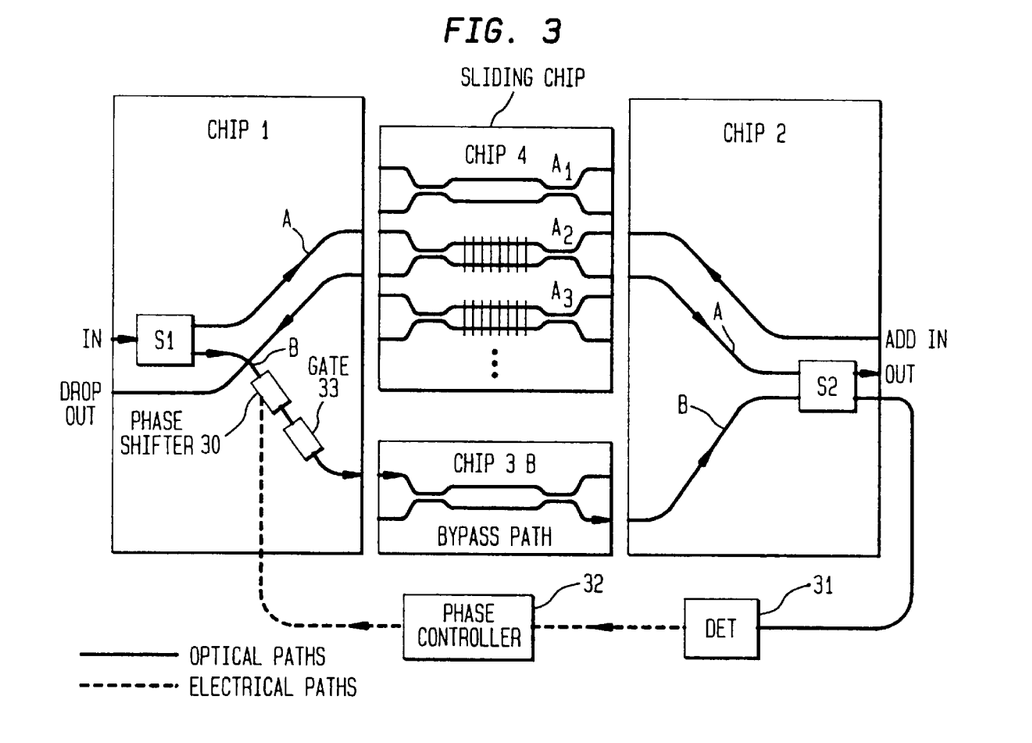
FIG. 3 is a schematic layout of an optical multiplexer including a reconfigurable add-drop unit.

FIG. 3 shows a preferred R-ADM comprising optical waveguide chips 1–4. Chip 4 is movable and is attached to the moving plate of a mechanical slider (not shown) so that its waveguides can be moved relative to those of chips 1 and 2. Chips 1,2 and 3 are fixed and can be combined in a single larger chip. However, as individual chips they can be easily diced out and have their edges polished, if necessary.

Chips 1 and 3 have thermo-optic switches S1 and S2 that can alter the lightwave from path A to path B. The upper path A goes through the sliding chip containing the ADFs, while the lower path B is a bypass arm. Assuming that light is propagating from left to right, switch S1 divides the lightwave between paths A and B and switch S2 recombines the two lightwaves, as in the path switch of FIG. 2.

Each path A1, A2, . . . is an ADF for channel 12, . . . respectively. The goal is that during reconfiguration, the lightwave is switched from path Ai to a bypass path B and then to a new path to Aj without losing even one bit during the switching. This can be done by keeping the transmission of lightwave nearly constant during switching. During the switching the optical signal travels on two paths and the transmission depends on the phase difference of the two paths.

To achieve maximum transmission, a phase shifter 30 in path B is adjusted over a range of at least $2\pi$. In general, the optimum phase shifter setting will be different for each optical path A1, A2, . . . that is paired with the bypass path B. These settings can be stored and one of them set before switching.

This method will work provided that the relative phase difference of optical paths A and B, $\phi_{AB}$, does not change with time. If the temperatures of different chips change by different amounts or if there is a slight change in the angles between chips, $\phi_{AB}$ will change. Such changes can degrade the transmission during switching.

To compensate for such changes, the phase shifter can be actively set just before switching takes place. To do this, a detector 31 is added to port 2 of the second 2×2 thermo-optic switch in FIG. 1. When signals are on both paths, the detected optical power from this port constitutes an error signal which is minimized when the phase shifter 32 is set to the optimum value. With this setting, the two paths are phased to give maximum output during switching. With this modification, the long term stability of optical paths to small phase changes in field transmission is not required and the storing of phase settings is unnecessary.

After reconfiguration, no significant lightwave should pass through path B. Such traffic would act as leakage bypassing the blocking of the dropped channel. If this leakage is not adequately stopped by S1 and S2 set in their bar states, a transmission gate 33 can be added to path B. During reconfiguration, it is powered and set to pass light. After reconfiguration, it is unpowered and set to block light, thereby further preventing leakage through path B. It could, for example, be similar to S1 of FIG. 2 and have only cross state connections to path B.

The R-ADM can be arranged so that except during reconfiguration, it is in an unpowered passive state. After reconfiguration the lightwave travels on path A. The phase shifter and gate in path B need only be powered during reconfiguration. The switches can also be set so that when unpowered they direct the lightwave along path A. The sliding-chip drive mechanism does not need to be powered to hold its position. Thus all devices can be left unpowered after reconfiguration. The switching sequence, given in the following section, illustrates this attractive feature.

One exception to this situation may be the need to actively control the temperature of the chip containing the Bragg reflectors so that they do not shift their resonant wavelengths with changes in ambient temperature. In the future waveguides may be available for which the effective refractive index does not change with temperature. In this case, such active temperature control will be unnecessary and the R-ADM will be completely passive after reconfiguration.

The following is an example of how reconfiguration can be carried out. Suppose we need to reconfigure by changing from path A1 to A3.

1. Power the gate to unblock bypass path B.
2. Power switches S1 and S2 to divide the lightwave between paths A1 and B, with only a small part of the power along path B.
3. Power the phase shifter to maximize the output power by minimizing the error signal on the detector.
4. Power switches S1 and S2 into the cross state, sending the lightwave entirely along path B.
5. Power the sliding chip drive and change from path A1 to path A3, then unpower this drive.
6. Slightly unpower switches S1 and S2 to divide the signal between path B and path A3, with only a small part of the power along A3.
7. Set the phase shifter to maximize the output power by minimizing the error signal.
8. Unpower switches S1 and S2 to direct the lightwave entirely along A3.
9. Unpower the gate blocking path B.
10. Unpower the phase shifter in path B.

Figure 4:
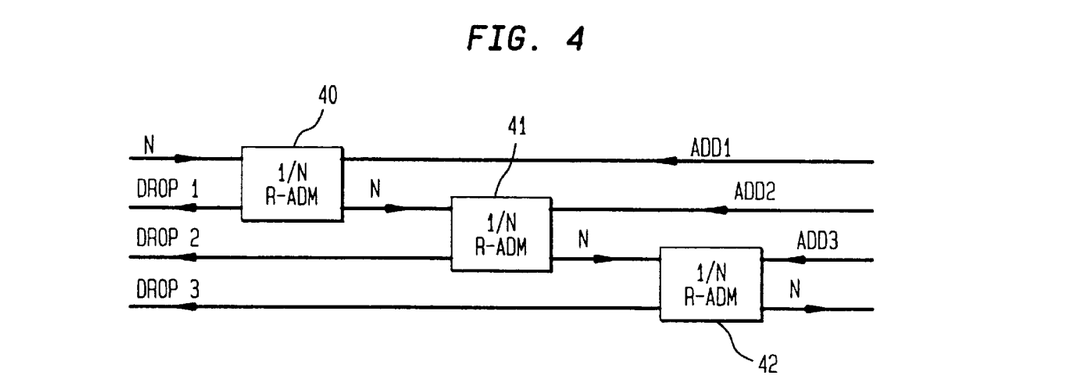
FIG. 4 illustrates how three of the units of FIG. 3 can be connected in series for add/dropping three channels.

This R-ADM has no intrinsic loss after reconfiguration and is low loss during reconfiguration. A number of such low loss reconfigurable ADM units can be put in series to independently add and drop that number of channels out of a larger set. FIG. 4 illustrates how a plurality of these reconfigurable ADMs can be placed in series to permit add-dropping of a plurality of channels at the same time. As illustrated, by placing 3 of these reconfigurable ADMs 40, 41, 42 in series, it would be possible to drop any 3 channels out of N. Each ADM drops either none or any one of the set.

Figure 5:
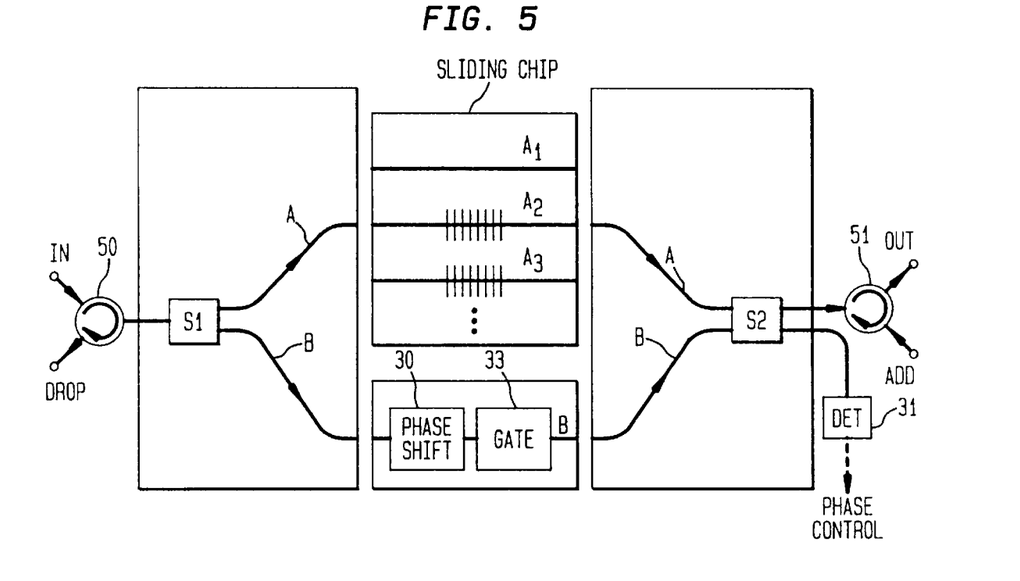
FIG. 5 is an alternate embodiment of a reconfigurable add-drop multiplexer using Bragg reflectors in place of 4-port add/drop filters.

It is possible to replace the 4-port ADFs A2, A3, . . . (shown in FIG. 3) by simple Bragg reflectors. (The bypass paths A1 and B could be replaced by straight waveguides). In addition to Bragg reflection, the function of the 4 port ADFs is to separate the dropped channel from the input and the added channel from the output. As shown in FIG. 5, the separations can be achieved by connecting 3-port optical circulators 50, 51 to the input and the output. This arrangement might be needed if the Bragg reflectors were to be formed in a set of optical fibers, all of the same length to within a few wavelengths and mounted on a sliding chip.

Figure 6:
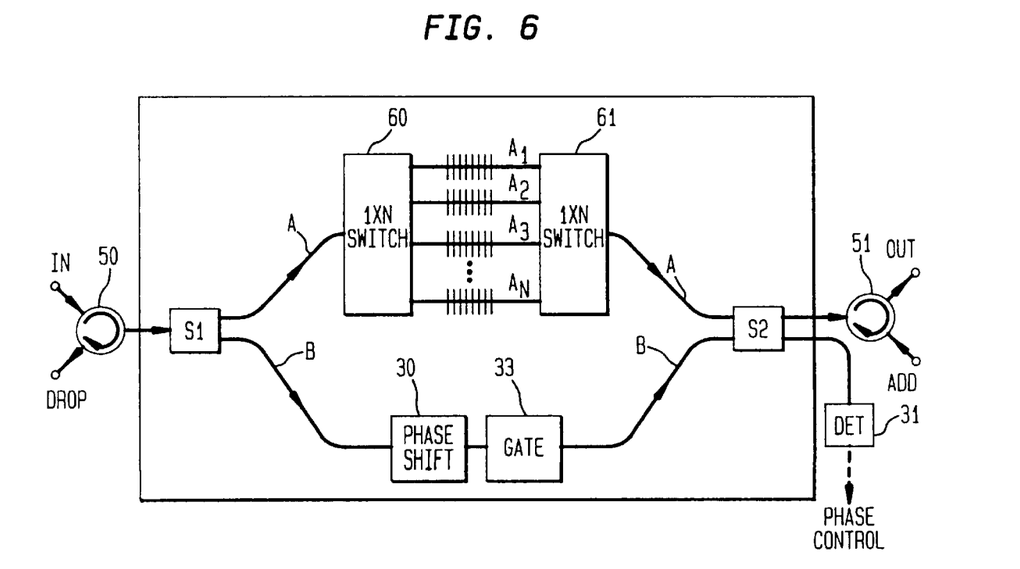
FIG. 6 is a alternate embodiment of a reconfigurable add-drop multiplexer using two 1×N switches in place of a sliding chip switch.

The sliding switch is used to select between N ADFS. As shown in FIG. 6, it is possible to replace this component by a pair of 1×N optical switches 60, 61. All paths must have the same length as the bypass path within a few wavelengths and the phase difference between these paths and the bypass path must not be polarization dependent.

In the above discussions, thermo-optic switches serve as a path switch, a transmission gate and a phase shifter. The switches can be replaced by other forms of optical switching that, like thermo-optic devices, change continuously, conserve energy between a pair of output ports and are polarization independent.

A reconfigurable add-drop multiplexer (R-ADM) can route the lightwave path through one of a set of fixed add-drop filters (ADFs). Each ADF add-drops one of the channels or passes all channels. The R-ADM is reconfigurable in the sense that it can change to a different ADF while maintaining nearly the maximum possible transmission between input and output. This is done by switching from the path through the ADFs to a bypass path. During switching, the lightwave travels on both paths. Maximum output is maintained by adjusting the phase delay in the bypass path. After switching to the bypass path, the unlit path through the ADFs is changed to a different ADF and then the lightwave is switched back to this path.

The selection of one of N alternative paths through different ADFs requires two synchronized 1×N switches. An attractive way of doing this is to slide a chip containing the ADFs between fixed waveguides on separate chips. In a preferred arrangement, the sliding chip drive and all switching and phase change devices can be turned off after reconfiguration. The R-ADM unit is then completely passive except for the overall temperature control needed to maintain constant ADF wavelengths.

This R-ADM unit has no inherent losses after reconfiguration. There is a loss of order 1 dB in the channels neighboring the add-dropped channel during switching between the A and B paths. The low intrinsic loss is maintained by using either 4-port ADFs in which identical Bragg reflectors are placed between 3 dB couplers or by using circulators at the input and output of the R-ADM. Because of the low insertion loss, it is practical to connect a number of R-ADM units in series to add-drop more than one channel.

As can now be seen in perspective, in accordance with the invention a reconfigurable add-drop multiplexer for a multi-channel optical communications system comprises a plurality of add-drop filters responsive to respectively different optical signal channels of the system, a first signal path through one of the filters, a second unfiltered signal path and a pair of switches. The first switch is for switching the multi-channel signal between the first and second paths. The second switch is for changing the add-drop filter in the first path while the signal is switched to the second path. Thus the multiplexer can be reconfigured to add or drop different signal channels.

In the preferred embodiment, one or more of the add-drop filters is an integrated optical device comprising two optical waveguides coupled by two spaced apart 3 dB couplers. Each waveguide includes a Bragg grating for reflecting the same optical signal channel. The first switch can be a pair of thermoptic switches, each comprising a pair of waveguide arms coupled by spaced apart 3 dB couplers. One arm provides a phase shift controllable by heating. The other provides a π phase shift as compared with the first arm when unheated. A second switch particularly useful when the add-drop filters are on a chip and the first switch is on one or more other chips, is a mechanical switch for sliding the filter chip in relation to the chips of the first switch.

III. DESIGN CONSIDERATIONS
A. Switching Between Coherent Optical Paths

We will refer to the optical field carrying the passed channels as the "lightwave". Let us first consider the case of switching the lightwave between the two paths A and B shown in FIG. 2. We will refer to the arrangement in FIG. 2 as the "path switch". The two identical thermo-optic switches S1 and S2 determine which path the light will take. The thermal induced phase change in the heater arm is φ. It will be described by a single parameter, because the arms of the two switches will be heated simultaneously by the same amount. Suppose that in the absence of power (φ=0), both thermo-optic switches (S1 and S2) are in the bar state and the lightwave is in path A, as in FIG. 2. By simultaneously changing both S1 and S2 to the cross state, the lightwave can be redirected to path B. For example, this can be done in FIG. 2 by applying power and changing φ from 0 to π.

During the switching, the light separates into two lightwaves traveling on paths A and B which interfere as they come together in S2. The interference depends on the phase difference of the two paths, $\phi_{AB}=\phi_A-\phi_B$. To maintain maximum transmission, we must ensure that $\phi_{AB}$ is such that the two lightwaves interfere constructively, maximizing the output at port 1 in FIG. 2. Since energy is conserved, this constructive interference is accompanied by a destructive interference, canceling the output at port 2 in FIG. 2.

To see how this comes about, let us analyze a simplified model, in which the thermo-optic switches have the ideal behavior that they would have if their couplers were exactly 3 dB (evenly dividing). We will drop phase changes common to the two paths considered, since they do not contribute to optical interference. In this case, the bar and cross state field transmissions of each coupler are equal and the transmission of each thermo-optic switch is given by:

$$t_b=\pm\sin(\phi/2-\pi/2)=\cos(\phi/2)$$
$$t_c=\cos(\phi/2-\pi/2)=\sin(\phi/2), \quad (3.1)$$

where $t_b$ and $t_c$ are the bar and cross state transmissions. The two signs of the bar state transmission refers to the upper and lower pairs of ports of the thermo-optic switches, respectively.

Using these transmission coefficients of the thermo-optic switches, the field transmission to port 1 of the path switch in FIG. 2 is given by $$t \times \cos(\phi_{AB}/2)+i\sin(\phi_{AB}/2)\cos(\phi) \quad (3.2)$$

and the power transmission $T=|t|^2$ is $$T=\cos^2(\phi_{AB}/2)+\sin^2(\phi_{AB}/2)\cos^2(\phi). \quad (3.3)$$

As expected, there is maximum transmission, T =1, independent of $\phi_{AB}$, when the switches are in the bar state ($\phi=0$) and the lightwave passes through path A or when the switches are in the cross state ($\phi=\pi$) and the lightwave passes through path B. There is also maximum transmission T =1 during switching, (independent of $\phi$), when the path phase difference $\phi_{AB}=2\pi N$, N =0, ±1, ±2, . . . For these values of $\phi_{AB}$, the switching between paths is reconfigurable.

The transmission drops to zero when the field amplitudes in each path are equal and are phased for maximum destructive interference: when $\phi_{AB}$ is equal to an odd multiple of $\pi$ and $\phi=\pi/2$.

Figure 7:
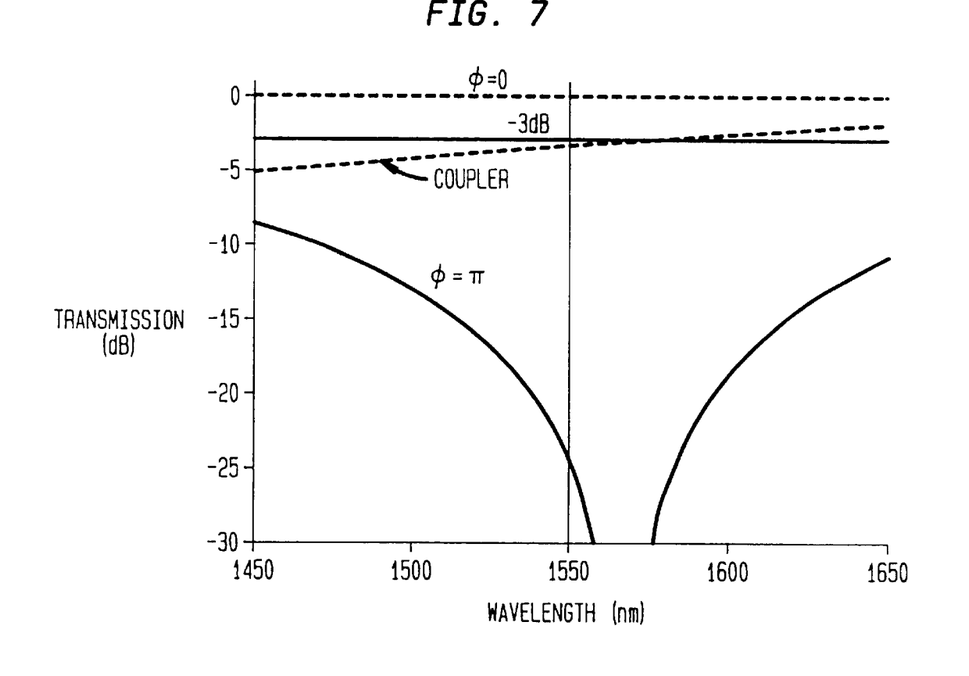
FIGS. 7–12 are graphical illustrations useful in explaining the operation of the multiplexer of FIG. 3.

To a good approximation, these conclusions continue to hold for actual thermoptic switches as long as the couplers are close to the ideal value of 3 dB. To illustrate this, we made a computer model of a more realistic switch for which the couplers change with wavelength. FIG. 7 shows the wavelength dependence of this switch. The bar state transmissions of the switch unpowered with $\phi=0$, fully powered with $\phi=\pi$ and the coupler transmission are plotted.

Figure 8:
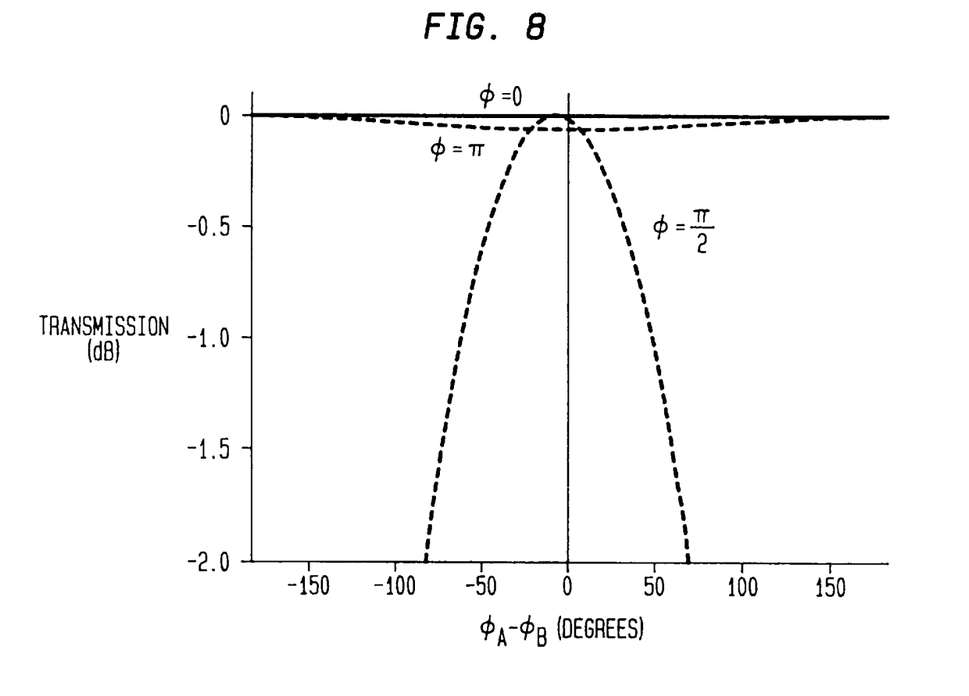

FIG. 8 shows the power transmission T of the path switch at a wavelength of 1550 nm versus $\phi_{AB}$ for different values of the heater phase $\phi$ corresponding to the bar state ($\phi=0$, A only), the cross state ($\phi=\pi$, B only), and half way between these two states ($\phi=\pi/2$, A and B). The transmission T is close to unity, if $\phi_{AB}$ is nearly zero or if the switch is in the bar or cross state.

Figure 9:
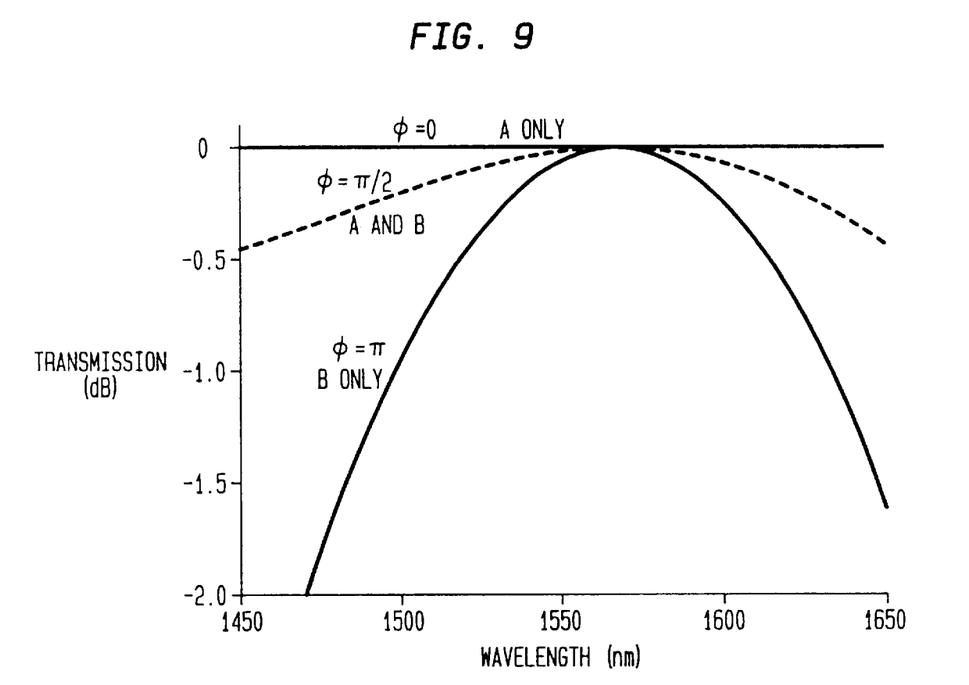

FIG. 9 shows the wavelength dependence of transmission T when $\phi_{AB}=0$ and $\phi=0$, $\phi=\pi/2$, and $\phi=\pi$, which correspond to transmission through path A, through paths A and B, and through path B. We see that the transmission loss is small over a broad wavelength range, especially when the switch is in the bar state and the lightwave is passing through path A. The wavelength dependence is mainly due to the deviation of the couplers from the optimum 3 dB value with wavelength. The broad wavelength response in the bar state is due to the well known behavior of Mach-Zehnder interferometer transmission. Independent of the values of the couplers, these devices have excellent nulls in the cross state and bar state peak transmissions near unity. We have put a $\pi$ phase shift in the arms of the thermo-optic switches in order that after reconfiguration, when the heaters are unpowered, these devices will be in the bar state and have broad-band transmission of close to unity.

B. Loss During Reconfiguration Due To Bragg Reflection Induced Dispersion

Figure 10:
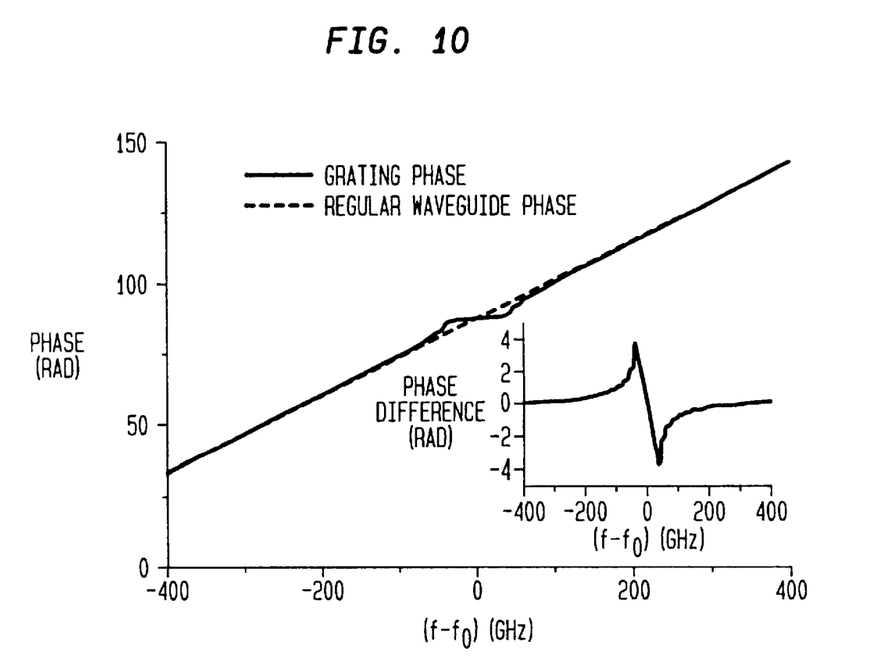

Gratings are devices characterized by regions in the spectrum (known as stop bands) where an optical field is highly reflected. This reflection attenuates the transmitted light and in transmission the Bragg reflector acts like a resonant absorber, characterized by a change in the imaginary refractive index. Through the Kramers-Kronig relations this leads to a change in the real part of the refractive index. Although the resonant absorption is almost entirely in the spectral range of a single channel, the real refractive index or phase change is broader and may affect adjacent channels. The above discussion implies that an optical field with frequency near the stop band will undergo a phase change significantly different from a field with frequency far removed from the stop band. In other words, near the stop band, the spectral dependence of the phase change in transmission is strongly modified. This can be seen in FIG. 10, where the phase response of a grating and of a regular waveguide (linear phase response) are plotted. The difference of the two curves is shown in the inset and shows the typical Kramers-Kronig refractive index change associated with a narrow band absorption. When such a grating is placed in one of the arms of our device, the phase response of the grating cannot be ignored.

Figure 11:
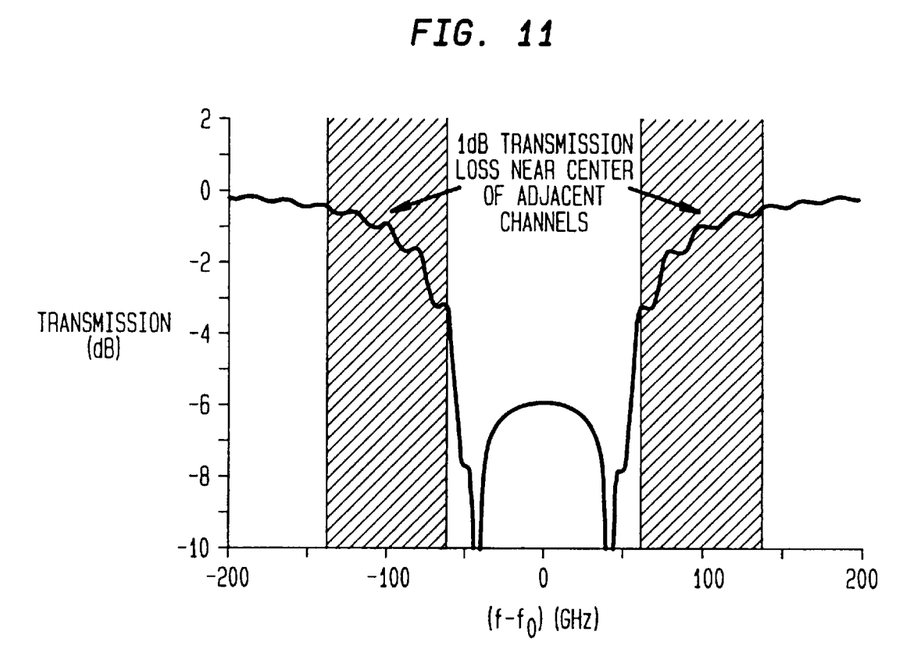

To account for the Bragg reflector, we calculate again the transmission of our device with idealized thermo-optic switches, but this time including the complex field transmission of the Bragg reflector (this includes the amplitude and phase response). If the grating is used to drop a channel centered around the center of the stop band, that channel will not be transmitted. However, the phase of neighboring channels (which are by design just outside the stop band) will be affected, and transmission T for these channels will be altered. To see this effect the complex transmission t of the complete device (including the grating) must be calculated. Equation 3.2 is modified to $$t=\cos^2(\phi/2)t_g e^{i(\phi_g/2-\phi_B/2)}+\sin^2(\phi/2)e^{-i(\phi_g/2-\phi_B/2)} \quad (3.4)$$

where $t_g e^{i\phi_g}$ is the field transmission of a waveguide containing a Bragg reflector. Finally, the power transmission (magnitude squared of the complex field transmission) T =$|t|^2$ at the wavelength of the neighboring channels is calculated to see the transmission loss suffered due to the dispersive properties of the grating in one of the arms. Such a calculation was undertaken using typical numbers for the fiber gratings, channel frequencies, and channel spacing. The results of this calculation are shown in FIG. 11; the solid line shows the transmission of the dropped channel during switching, when half of the light is in the grating arm and half is in the bypass arm. The shaded region shows the spectral region of the two adjacent channels. The transmission loss at these neighboring channels is approximately 1 dB.

C. Effect Of Path Length Inequality

We have shown that the path switch in FIG. 2 is reconfigurable provided that the phase difference of paths A and B $\phi_{AB}=2\pi N$, where N is an integer. This phase difference results from a path length difference $\Delta L=L_A-L_B$. For waveguides with a common effective refractive index $n(\lambda)$, $\phi_{AB}=2\pi n\Delta L/\lambda$. As the wavelength $\lambda$ changes, $\phi^{AB}$ will change and the phase condition will not be exactly met.

Figure 12:
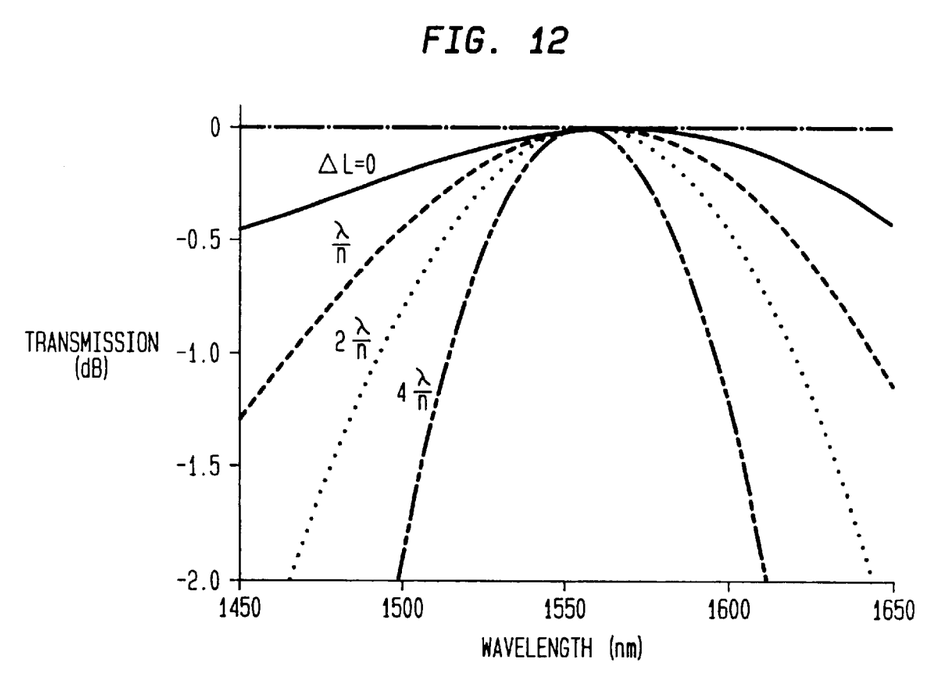

The change of $\phi_{AB}$ with wavelength causes loss in the transmission during switching, when the lightwave is traveling on both paths A and B and optical interference takes place. This is illustrated FIG. 12 for path length differences of 0 to 4 wavelengths in the medium. This calculation shows that to have broad band transmission during reconfiguration, the path length difference should not be more than a few wavelengths. The path switch in FIG. 2 is analogous to a Mach-Zehnder interferometer, with the thermo-optic switches serving as effective couplers connected by arms A and B. For broad-band response, the arm length difference $\Delta L$ should not be more that a few wavelengths. It is practical to achieve this using integrated optic chips by making the paths A and B as symmetrical as possible.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A reconfigurable add-drop multiplexer for a multichannel optical communications system comprising:

a plurality of add-drop filters responsive to respectively different optical signal channels of said system, a first optical path for coupling an optical multichannel signal through an add-drop filter of said plurality;

a second optical path for coupling an optical signal through an unfiltered bypass path, said second path having an optical pathlength equal to the first:

a first switch for optically switching an optical signal between said first path and said second path without interrupting said signal; and a second switch for changing the add-drop filter in said first path while said optical signal is coupled to said second path and an optical phase shifter in said first path or said second path for maintaining the relative phase difference between the first and second paths whereby said multiplexer can be reconfigured to add or drop different signal channels without the loss of bits.

2. The reconfigurable multiplexer of claim 1 wherein one or more of said add-drop filters comprises an integrated optical device comprising two optical waveguides coupled by two spaced apart 3 dB couplers, said waveguides each including along their length between the couplers, a Bragg grating for reflecting an optical signal channel.

3. The reconfigurable multiplexer of claim 1 wherein said first switch comprises a pair of thermoptic switches.

4. The reconfigurable multiplexer of claim 3 wherein each thermoptic switch comprises a pair of optical waveguide arms coupled by two spaced apart 3 dB couplers, one arm of said pair providing a phase shift controlled by heating and the other arm providing a phase shift of $\pi$ as compared with the first arm when not heated.

5. The reconfigurable multiplexer of claim 1 wherein said plurality of add-drop filters are formed on a first chip, said first switch is formed on one or more additional chips, and said second switch comprises a mechanical switch for sliding said first chip in relation to the chip of the first switch, whereby the add-drop filter in said first optical path is changed.

6. The reconfigurable multiplexer of claim 1 wherein at least one of the add-drop filters is a four port filter comprising an input port for receiving a multichannel input signal, an output port for presenting an output signal, an add port for receiving a signal channel to be added and a drop port for presenting a signal channel to be dropped.

7. The reconfigurable multiplexer of claim 1 wherein at least one of the add-drop filters is a Bragg grating.

8. The reconfigurable multiplexer of claim 1 wherein said second switch comprises a pair of 1×N optical switches.

9. The reconfigurable add-drop multiplexer of claim 1 wherein one of the first and second optical paths includes a feedback-controlled optical phase shifter for maintaining the relative phase difference between the optical paths.

10. The multiplexer of claim 9 wherein said second optical path includes said phase shifter.

11. The multiplexer of claim 5 wherein said first chip includes a non-filtering path.

12. A multiplexer comprising a plurality of reconfigurable add-drop multiplexers according to claim 1 connected in series to permit adding and dropping of a plurality of channels at the same time.

* * * * *